(12) United States Patent
Mazzola et al.

(10) Patent No.: US 10,583,628 B2
(45) Date of Patent: Mar. 10, 2020

(54) STIFF POLYETHYLENE FILM WITH ENHANCED OPTICAL PROPERTIES

(75) Inventors: Nicolas C. Mazzola, Jundiai (BR); Jorge C. Gomes, Sao Paulo (BR); Marcelo D. Cantu, Campinas (BR)

(73) Assignee: DOW BRASIL INDÚSTRIA E COMÉRCIO DE PRODUTOS QUÍMICOS LTDA, Sao Paulo (BR)

( * ) Notice: Subject to any disclaimer, the term of this patent is extended or adjusted under 35 U.S.C. 154(b) by 491 days.

(21) Appl. No.: 13/458,457

(22) Filed: Apr. 27, 2012

(65) Prior Publication Data
US 2013/0288032 A1    Oct. 31, 2013

(51) Int. Cl.
| B32B 7/02 | (2019.01) |
| B32B 27/32 | (2006.01) |
| B32B 27/08 | (2006.01) |

(52) U.S. Cl.
CPC .............. *B32B 7/02* (2013.01); *B32B 27/08* (2013.01); *B32B 27/32* (2013.01); *B32B 27/327* (2013.01); *B32B 2250/242* (2013.01); *B32B 2307/308* (2013.01); *B32B 2307/406* (2013.01); *B32B 2307/412* (2013.01); *B32B 2439/00* (2013.01); *Y10T 428/24992* (2015.01)

(58) Field of Classification Search
None
See application file for complete search history.

(56) References Cited

U.S. PATENT DOCUMENTS

| 3,645,992 A | 2/1972 | Elston |
| 3,914,342 A | 10/1975 | Mitchell |
| 3,998,914 A * | 12/1976 | Lillis et al. .................. 525/240 |
| 4,076,698 A | 2/1978 | Anderson et al. |
| 4,599,392 A | 7/1986 | McKinney et al. |
| 5,272,236 A | 12/1993 | Lai et al. |
| 5,278,272 A | 1/1994 | Lai et al. |
| 5,502,112 A * | 3/1996 | Peacock .................. 525/240 |
| 5,582,923 A | 12/1996 | Kale et al. |
| 5,635,286 A | 6/1997 | Morita et al. |
| 5,916,692 A | 6/1999 | Brambilla |
| 6,623,866 B2 * | 9/2003 | Migliorini et al. .......... 428/516 |
| 6,689,857 B1 * | 2/2004 | Larter et al. ............... 526/348.5 |
| 6,703,141 B1 | 3/2004 | Lu et al. |
| 6,903,162 B2 | 6/2005 | Nygard et al. |
| 7,601,409 B2 | 10/2009 | Ohlsson |

| 2002/0037386 A1 * | 3/2002 | Bonke ................ B32B 27/32 428/40.1 |
| 2002/0120077 A1 * | 8/2002 | Kellum .................. C08F 4/24 526/113 |
| 2002/0183433 A1 * | 12/2002 | Dohrer et al. .............. 524/425 |
| 2002/0187326 A1 * | 12/2002 | Kong ................ B32B 27/32 428/220 |
| 2004/0249047 A1 * | 12/2004 | Golze et al. ................ 524/475 |
| 2005/0003175 A1 | 1/2005 | Nygard et al. |
| 2005/0175803 A1 | 8/2005 | Breese |
| 2005/0197459 A1 | 9/2005 | Breese |
| 2007/0215609 A1 * | 9/2007 | Su et al. ................... 219/730 |
| 2009/0286024 A1 * | 11/2009 | Lu ........................ B32B 27/32 428/34.9 |
| 2010/0092793 A1 * | 4/2010 | Aithani ................ B32B 27/00 428/483 |
| 2010/0125114 A1 * | 5/2010 | Williams et al. ........... 524/231 |
| 2013/0059140 A1 * | 3/2013 | Hlavinka et al. .......... 428/220 |
| 2013/0288032 A1 | 10/2013 | Mazzola et al. |
| 2014/0329103 A1 * | 11/2014 | Zaikov ................ B32B 27/08 428/516 |

FOREIGN PATENT DOCUMENTS

| WO | 2004/024433 A2 | 3/2004 |
| WO | WO-2009110887 A1 | 9/2009 |

OTHER PUBLICATIONS http://www.pslc.ws/macrog/pe.htm. http://www.kylesconverter.com/mass/mil-to-microns.*
English Abstract of Chikanari et al. (JP 2004/099679), Apr. 2004.*
Billham, M., et al., The Effect of Extrusion Processing Conditions on the Properties of Blown and Cast Polyolefin Packaging Films, Dev. Chem. Eng. Mineral Process 1, 2003, pp. 137-146.
Halle, R., et al., Opportunities for a New Metallocene Polyethylene in Shrink & Stretch Film Applications, AMI Stretch & Shrink Films 2009, Oct. 26-27, 2009 Atlanta, GA.
Matweb, "LyondellBasell Alathon M6030 High Density Polyethylene", Accessed Online: Oct. 11, 2018, MatWeb, LLC., 2 Pages. URL: http://www.matweb.com/search/datasheet.aspx?matguid=52e8c8c105074fc6b5983ecccecab41f.

* cited by examiner

*Primary Examiner* — Ronak C Patel
(74) *Attorney, Agent, or Firm* — Cantor Colburn LLP

(57) ABSTRACT

The present invention relates to polyethylene films having a combination of high stiffness and good optics. The cast films have a first layer comprising a linear polyethylene having a density greater than 0.94 g/cm$^3$ and a melt index less than or equal to 1.3 g/10 min together with a second layer comprising a linear polyethylene having a density greater than 0.94 g/cm$^3$ and a melt index greater than or equal to 2.0 g/10 min. The second layer is an external layer of the film.

13 Claims, No Drawings

STIFF POLYETHYLENE FILM WITH ENHANCED OPTICAL PROPERTIES

FIELD OF THE INVENTION

This invention relates to films and more particularly to cast films having good stiffness attributes together with enhanced optical properties.

BACKGROUND AND SUMMARY

Laminated films are widely used for packaging applications. The combinations of coating layers and substrates can be varied, depending on the intended application's functional requirement. The materials selected for each of the layers may be adjusted depending on whether physical properties such as thermal stability, barrier properties, abuse resistance, sealing, etc, or package aesthetics, such as high gloss, transparency, printing, etc., are more important. Further the materials may need to be adjusted to ensure compatibility between the materials.

A significant part of the market uses glossy films as external layers for laminated packages in order to promote either the appearance of the product or the packaging printing and therefore garner the attention of end user at shelves. In addition to high gloss, such films must possess adequate stiffness for the aesthetics as well as functionality of the package.

Current films touted for use in high gloss packages typically use polyethylene terephthalate (PET), biaxially oriented polypropylene (BOPP) and cast polypropylene (PP) as the external layer or layers. These films are generally produced using cast process and can be submitted to an orientation process in order to increase stiffness and reduce thickness. The demand on these films is increasing year after year, with some restrictions on supply already occurring amongst laminated films producers.

Stiff, glossy and transparent films are especially appreciated for lamination purposes since they will be printed and used as an external layer in a laminated structure. Polyethylene films have small participation at the premium segment of this market due to its inherent characteristics of low stiffness, low gloss and high haze when compared to incumbent materials PET, cast PP and BOPP.

The use of high molecular weight polyethylene materials resins in cast film extrusion processes has recently been considered for such applications, mainly looking at the different film properties cast stretch films can obtain using those materials. Compared to blown film processes, the range of cooling rates of cast film extrusion process is broader and can be more easily adjusted according to the final film property desired. These process features are known in the art (see, for example, Billham, M.; Clarke, A. H.; Garrett, G.; McNally, G. M.; Murphy, W. R., *The Effect of Extrusion Processing Conditions on the Properties of Blown and Cast Polyolefin Packaging Films*, Dev. Chem. Eng. Mineral Process 1, pp. 137-146, 2003; or Giles, H. F. Jr.; Wagner, J. R. Jr.; Mount, E. *Extrusion—The Definitive Processing Guide and Handbook*, William Andrew Publishing/Plastics Design Library, 2005).

Polyethylene can be divided into high-density (HDPE, density 0.941 g/cm³ or higher), medium-density (MDPE density from 0.926 to 0.940 g/cm³), and low-density (LDPE, density from 0.910 to 0.925 g/cm³). See ASTM D4976-98: Standard Specification for Polyethylene Plastic Molding and Extrusion Materials. Molecular weight of the polymer, which can be expressed as averages values ($M_n$, $M_w$, $M_z$), is correlated to the polymers melt index as determined according to ASTM D 1238 (2.16 kg, 190° C.).

In Wen Halle's article, "Opportunities for a New Metallocene Polyethylene in Shrink & Stretch Film Applications", AMI Stretch & Shrink Films 2009 Oct. 26-27, 2009 Atlanta, Ga., advantages of using materials with low MI (that is, high molecular weight) at high strain levels, are taught, however those materials are generally in the density range of 0.910-0.940 g/cm³ depending on the functional layer they are assigned—cling, structural, release. US 007601409B2 and WO 2009/110887 describe increasing the strain hardening behavior of stretch film by adding a propylene based copolymer or mLLDPE materials that are stiffer when stretched.

US005916692 A discusses the use of LDPE materials in stretch films and the improvement in stiffness under high strain however the density range disclosed is from 0.915 to 0.935 g/cm³.

The use of HDPE type of materials for stretch films applications is very limited, as these materials have low toughness and tend to easily split once stretched. HDPE films are used when stiffness is the main requirement of the final application and the stiffness can be increased through film orientation after the extrusion.

US 20050197459 teaches the use of uniaxial machine direction orientation (MDO) process for enhancing the optical properties of blown HDPE films. This two step process, however, adds cost to the production chain and makes it non-competitive for lamination purposes.

The production of cast films may be used to generate films with good optical properties (high gloss and low haze) due to the combination of fast cooling and flat surfaces (chill roll), which reduces internal haze. On the other hand these films are generally not stiff enough to deliver the same performance as cast PP, BOPP or PET based films, even when HDPE materials are used.

Accordingly, there is still the need for polyethylene films having the combination of high stiffness and good optics. It has been found that the combination of resins with low MI in the core and high MI in the external layer (s), each with a density above 0.940 g/cm³ for use in a cast process may produce PE films with excellent performance, delivering high stiffness, high gloss levels and very low haze. Thus, present invention relates to a multilayer cast film comprising a first layer comprising a linear polyethylene having a density greater than 0.94 g/cm³ and a melt index less than or equal to 1.3 g/10 min together with a second layer comprising a linear polyethylene having a density greater than 0.94 g/cm³ and a melt index greater than or equal to 2.0 g/10 min. The second layer is an external layer of the film.

DETAILED DESCRIPTION OF THE INVENTION

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single site catalyzed Linear Low Density Polyethylene, including both linear and substantially linear low density resins (m-LLDPE); and High Density Polyethylene (HDPE). These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference). LDPE resins typically have a density in the range of 0.916 to 0.940 g/cm$^3$.

The term "LLDPE", includes both resin made using the traditional Ziegler-Natta catalyst systems as well as single-site catalysts such as metallocenes (sometimes referred to as "m-LLDPE"). LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The Linear PE can be made via gas-phase, solution-phase or slurry polymerization or any combination thereof, using any type of reactor or reactor configuration known in the art, with gas and solution phase reactors being most preferred.

The term "HDPE" refers to polyethylenes having densities greater than about 0.940 g/cm3, which are generally prepared with Ziegler-Natta catalysts, chrome catalysts or even metallocene catalysts.

The following analytical methods are used in the present invention:

Density is determined in accordance with ASTM D792.

"Melt index" also referred to as "I$_2$" is determined according to ASTM D1238 (190° C., 2.16 kg).

2% Secant Modulus is determined according to ASTM D882.

Elmendorf Tear is determined according to ASTM D-1922.

Gloss is determined at a 45° angle according to ASTM D-2457.

Haze of the resulting film refers to the total haze (that is internal haze plus external haze) and is determined according to ASTM D1003.

Clarity is determined according to ASTM D1746.

Cast Films

In its broadest sense the present invention is a cast film comprising at least the following layers:
   a. a first layer comprising a linear polyethylene having a density greater than 0.94 g/cm$^3$ and a melt index less than or equal to 1.3 g/10 min;
   b. a second layer comprising a linear polyethylene having a density greater than 0.94 g/cm$^3$ and a melt index greater than or equal to 2.0 g/10 min;
      wherein the second layer is an external layer of the film.

Preferably, the cast film will comprise a third layer which is also an external layer and where the third layer also comprises a linear polyethylene having a density greater than 0.94 g/cm$^3$ and a melt index greater than or equal to 2.0 g/10 min, which may advantageously, but not necessarily, be the same linear polyethylene as the one used in the second layer.

Other layers might be also added depending on the particular cast extrusion machine capabilities in order to deliver specific attributes such as packages with barrier properties or good seal ability. These additional layers, however, are in addition to the invention herein described as the inventive films always contain at laest two layers with a first layer comprised of one or more linear polyethylenes having a density greater than 0.94 g/cm$^3$ and a melt index less than or equal to 1.3 g/10 min and a second layer comprising one or more linear polyethylenes having a density greater than 0.94 g/cm$^3$ and a melt index greater than or equal to 2.0 g/10 min, wherein the second layer is an one external layer of the film.

The first layer will generally comprise from 30 to 80 percent by weight of the cast film, more preferably from 40 to 70 percent by weight of the cast film. The second layer will generally comprise from 20 to 70 percent by weight of the cast film more preferably from 30 to 60 percent by weight of the cast film. It is generally preferred that the third layer, when present be approximately the same thickness as the second layer, and hence when present it is generally preferred that the third layer and second layer each comprise from 5 to 40 percent by weight of the cast film more preferably from 10 to 30 percent by weight of the cast film. It is also contemplated that the cast film may comprise additional layers. These layers may be selected to provide additional functionality, for example barrier properties or seal ability.

Each of the layers of the films of the present invention will comprise a High Density Polyethylene polymer (HDPE). HDPE materials are well known in the art, and in general refer to linear polyethylene materials having a density of at least 0.940 g/cm$^3$. Any type of Linear PE can be used in the present invention. This includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The HDPE can be made via gas-phase, solution-phase or slurry polymerization or any combination thereof, using any type of reactor or reactor configuration known in the art, with gas and slurry phase reactors being most preferred. Preferred HDPE resins are sold by The Dow Chemical Company under the trade name DOWLEX™ 2050B and ELITE™ 5960G for example.

The HDPE component for use in the first layer (an internal layer in a structure with at least 3 layers) has a density of at least 0.940 g/cm$^3$, more preferably at least 0.942 g/cm$^3$. The HDPE component for use in the first layer also has a melt index less than 1.3 g/10 min, more preferably less than 1.0 g/10 min.

The first layer preferably contains from about 50 to 100% of one or more HDPE meeting the density and melt index limitations, but may also contain other materials. Thus the total composition for use in the first layer may advantageously comprise from 75 to 98% HDPE or from 85 to 90% HDPE. One polymer which may advantageously be added to the core layer in a minor amount is a high pressure low density type resin known in the industry as Low Density Polyethylene or LDPE. LDPE having a density in the range of 0.917 to 0.935 g/cm$^3$, preferably 0.920 to 0.929 g/cm$^3$ are preferred. It is also preferred that the LDPE have a melt index of from 0.1 to 5.0 g/10 min, more preferably from 0.3 to 2.0 g/10 min. While the first layer of the present invention may contain as much as 50 percent by weight LDPE, it is preferred that the first layer comprise from 2-20 percent LDPE, more preferably from 5 to 15% LDPE.

The HDPE component for use in the second and/or third layers (the external layers) has a density of at least 0.940 g/cm³. The HDPE component for use in the second or third layers also has a melt index greater than 2.0 g/10 min, more preferably greater than 3.0 g/10 min and lower than 10 g/10 min.

The second layer preferably contains from about 80 to 100% of one or more HDPE resins meeting the density and melt index limitations, but may also contain other materials. Thus the total composition for use in the first layer may advantageously comprise from 75 to 98% HDPE or from 85 to 90% HDPE. It is preferred that all (that is 100%) of the resin used in the second and third layers be HDPE resin of the sort mentioned above.

The cast films of the present invention can be made by conventional cast film methods as is generally known in the art. While not necessary for practice of the present invention, it is possible to subject the films to post-extrusion mono- or biaxial orientation. In some embodiments the films of the present invention may be advantageously stretched at least 50%, preferably at least 100% in the machine and/or cross directions.

The second and the third external or "skin" layers each preferably comprise from 10 to 30% by weight of the cast film, independently. It may be advantageous for the film to have an overall thickness of from 7 to 30 microns thick, with films less than or equal to 23 microns being generally preferred.

It is also contemplated that the cast film may comprise additional. These layers may be selected to provide additional functionality, such as barrier properties or sealing properties.

As is generally known in the art, each of the layers may include additives, such as pigments, inorganic fillers, UV stabilizers, antioxidants, slip or antiblock additives, etc.

The cast films of the present invention will be marked by high stiffness as evidenced by their 2% secant modulus. Preferably the films will have a 2% secant modulus of at least 400 MPa, more preferably greater than 450 MPa.

The cast films of the present invention will also be characterized by having high machine direction orientation as evidenced by it Elmendorf Tear values. Preferably the films will have an Elmendorf Tear in the Machine Direction (MD) of lower than 200 g, more preferably lower than 50 g.

The cast films of the present invention may also be characterized by having low haze values. "Haze" of the resulting film refers to the total haze (that is internal haze plus external haze) and is determined according to ASTM D1003. As is known in the art the total haze value will depend on the thickness of the film being measured. Thus for purposes of this application the reported "equivalent" haze values will be based on a film thickness of 50 microns. A film or seal having a greater thickness than 50 microns will have an observed total haze somewhat higher than its equivalent haze, whereas a film or seal which is less than 50 microns will have an observed haze somewhat less than its equivalent haze. The seals of the present invention should have a normalized haze values for a 50 microns films of 20% or less, more preferably 15% or less, still more preferably 13% or less.

The cast films of the present invention will also have relatively high gloss values. Preferably the gloss at 45° of the films will be at least 68 gloss units, more preferably at least 70 gloss units.

The cast films of the present invention will also have relatively high clarity values. Preferably the clarity of the films will be at least 90%, more preferably at least 95%.

EXAMPLES

In order to demonstrate the effectiveness of the present invention a series of 3 layer cast films were made. The films are made on a Dr. Cohn cast line with a 0.7 mm die gap, a set temperature of 235° C., a chill temp of 16° C., at an output of 6 kg/h using the resins described on Table 1. The winding speed is adjusted to produce films of various thicknesses as reported in Table 2. The film structures are all A/B/A with each A layer being the same and representing 25% by weight of the film with the B layer representing the remaining 50%.

The following resins are used:

TABLE 1

PE materials characterization.

| | I2 @ 190° C. 2.16 kg (g/10 min) | Density (g/cm3) |
| --- | --- | --- |
| Resin A (HDPE) | 4.01 | 0.9425 |
| Resin B (LLDPE) | 1.02 | 0.9223 |
| Resin C (HDPE) | 0.90 | 0.9636 |
| Resin D (HDPE) | 1.05 | 0.9536 |
| Resin E (HDPE) | 0.85 | 0.9433 |
| Resin F (LDPE) | 0.25 | 0.922 |

TABLE 2

Film structures

| | Film Structures | | | Nominal Thickness (µm) |
| --- | --- | --- | --- | --- |
| | A (25%) | B (50%) | A (25%) | |
| Comparative Example 1 | 100% Resin A | 100% Resin A | 100% Resin A | 12 17 23 |
| Comparative Example 2 | 100% Resin A | 100% Resin B | 100% Resin A | 12 17 23 |
| Comparative Example 3 | 100% Resin D | 100% Resin D | 100% Resin D | 23 |
| Inventive example 4 | 100% Resin A | 100% Resin C | 100% Resin A | 17 23 |
| Inventive example 5 | 100% Resin A | 100% Resin D | 100% Resin A | 12 17 23 |
| Inventive Example 6 | 100% Resin A | 100% Resin E | 100% Resin A | 17 23 |
| Inventive Example 7 | 100% Resin A | 90% Resin D + 10% Resin F | 100% Resin A | 12 17 |

Films properties of all 16 samples (different thicknesses for each of the 7 numbered examples) are presented on Table 4. Inventive examples demonstrate that films with high modulus could be obtained by using HDPE resins (density>0.940 g/cm³) with high molecular weight ($I_2$<1.3 g/10 min) in the core layer. It is also possible to notice the advantage of having a material with lower molecular weight ($I_2$>2.0 g/10 min) on the external layers to achieve better optical properties. In addition, the use of HDPE in the core layer (inventive examples) versus the use of LLDPE (comparative example 2) results in advantages on 2% secant modulus MD.

The addition of small amount of LDPE seems to be beneficial for improving film stiffness as demonstrated by the increase in 2% secant modulus (inventive example 7).

TABLE 3

Tear resistance, optical properties and secant modulus of PE cast films.

| | Thickness (μm) | Normaized Haze at 50 μm (%) | Gloss 45° | Clarity (%) | Tear MD (g) | Sec. Mod. 2% MD (MPa) | Sec. Mod. 2% CD (MPa) |
|---|---|---|---|---|---|---|---|
| Comparative Example 1 | 13 | 13.2 | 72.4 | 99.6 | 19.2 | 454 | 474 |
| | 18 | 12.2 | 64.8 | 99.7 | 22.6 | 343 | 597 |
| | 23 | 11.8 | 68.1 | 99.6 | 28.1 | 481 | 489 |
| Comparative Example 2 | 13 | 13.9 | 71.4 | 99.6 | 18.3 | 345 | 414 |
| | 17 | 10.8 | 75.3 | 99.7 | 31.8 | 275 | 356 |
| | 23 | 9.0 | 74.1 | 99.6 | 80 | 244 | 264 |
| Comparative Example 3 | 23 | 15.9 | 65.6 | 99.3 | 32 | 705 | 895 |
| Inventive example 4 | 18 | 19.1 | 72.5 | 98.7 | 30 | 524 | 691 |
| | 24 | 16.7 | 71.4 | 98.8 | 22.3 | 545 | 646 |
| Inventive example 5 | 14 | 11.3 | 74.4 | 99.5 | 9.6 | 572 | 700 |
| | 18 | 11.0 | 75.6 | 99.4 | 13.6 | 493 | 587 |
| | 23 | 10.6 | 70.6 | 99.6 | 21.6 | 480 | 579 |
| Inventive Example 6 | 18 | 13.3 | 70.9 | 99.2 | 11.6 | 497 | 649 |
| | 23 | 12.7 | 72.9 | 99 | 25 | 409 | 472 |
| Inventive Example 7 | 13 | 12.3 | 80.5 | 93.6 | 10.0 | 767 | 822 |
| | 16 | 10.7 | 79.4 | 95.1 | 10.4 | 771 | 905 |

The comparative example 3 is added to the study as possible ways to further increase the film's secant modulus. The use of low melt indices materials (<1.3 g/10 min) in the external layers decreases gloss at 45° levels of the films, property that is essential for laminated films. Gloss at 45° levels greater than 70 units are generally required for these applications, and thus these examples are not within the scope of the present invention despite the high stiffness.

In order to demonstrate that the higher orientation was achieved by the use of high molecular weight HDPE materials, total shrinkage tests are performed. The influence of melt index on film orientation—and therefore total shrinkage—is demonstrated. The influence on density is also seen when comparative example 2 and inventive examples 4 to 7 are compared. The higher density materials presented higher shrinkage values and therefore higher orientation during process, which leads to higher modulus. Obviously, density contribution may be taken into account. All values are shown at Table 5.

The use of LDPE may contribute to even more orientation (Inventive Example 7). Reliable shrinkage percentage is not possible to be determined due to formation of "holes" during shrinkage procedure. This behavior, which is not found during evaluation of films based on different linear PEs, might be attributed to the very high level of film orientation provided by LDPE addition.

TABLE 4

Free Shrinkage at 150° C. of PE cast films.

| | Thickness (μm) | MD Free Shrinkage (%) | CD Free Shrinkage (%) |
|---|---|---|---|
| Comparative Example 1 | 13 | 62 | 8 |
| | 18 | 63 | 8 |
| | 23 | 57 | 3 |
| Comparative Example 2 | 13 | 84 | −2 |
| | 17 | 81 | 0 |
| | 23 | 81 | 3 |
| Comparative Example 3 | 23 | 88 | −1 |
| Inventive example 4 | 18 | 86 | 4 |
| | 24 | 88 | 1 |

TABLE 4-continued

Free Shrinkage at 150° C. of PE cast films.

| | Thickness (μm) | MD Free Shrinkage (%) | CD Free Shrinkage (%) |
|---|---|---|---|
| Inventive example 5 | 14 | 88 | 8 |
| | 18 | 87 | 9 |
| | 23 | 85 | 14 |
| Inventive example 6 | 18 | 90 | 5 |
| | 23 | 88 | −1 |

What is claimed is:

1. A multilayer cast film comprising:
    a. a first layer comprising 5 to 15 wt % of low density polyethylene and a linear polyethylene having a density greater than 0.94 g/cm3 and a melt index less than or equal to 1.3 g/10 min; and
    b. a second layer comprising 80 to 100 wt. % of a high density linear polyethylene having a density greater than 0.94 g/cm3 and a melt index greater than or equal to 2.0 g/10 min; wherein the second layer is an external layer of the film; wherein said multilayer cast film has a clarity greater than 90%; wherein the multilayer cast film comprises at least 3 layers and wherein each external layer independently comprises a linear polyethylene having a density greater than 0.94 g/cm3 and a melt index greater than or equal to 2.0 g/10 min.

2. The multilayer cast film of claim 1, wherein each external layer comprises the same linear polyethylene.

3. The multilayer cast film of claim 1 wherein the first layer comprises a linear polyethylene having a density greater than 0.95 g/cm3.

4. The multilayer cast film of claim 1 wherein the first layer comprises a linear polyethylene having a melt index less than or equal to 1.0 g/10 min.

5. The multilayer cast film of claim 1 wherein the second layer comprises a linear polyethylene having a melt index greater than or equal to 3.0 g/10 min.

6. The multilayer cast film of claim 1 further comprising one or more additional polymers in first layer, wherein the additional polymer comprises less than 50% by weight of the first layer.

7. The multilayer cast film of claim 6 wherein the additional polymer is a low density polyethylene.

8. The multilayer cast film of claim 1 wherein said film has a total thickness of 23 microns or less.

9. The multilayer cast film of claim 1 wherein said film has a 2% secant modulus in the machine direction of at least 400 MPa.

10. The multilayer cast film of claim 1 wherein said film has an Elmendorf Tear in the machine direction lower than 200 g.

11. The multilayer cast film of claim 1 wherein said film has a normalized haze value at 50 microns of less than 20%.

12. The multilayer cast film of claim 1 wherein said film has a gloss 45° greater than 70 gloss units.

13. A multilayer cast film comprising:
 a. a first layer comprising 5 to 15 wt % of low density polyethylene and a linear polyethylene having a density greater than 0.94 g/cm3 and a melt index less than or equal to 1.0 g/10 min; and
 b. a second layer comprising 80 to 100 wt. % of a high density linear polyethylene having a density greater than 0.94 g/cm3 and a melt index greater than or equal to 2.0 g/10 min; wherein the second layer is an external layer of the film; wherein said multilayer cast film has a clarity greater than 90%; wherein the multilayer cast film comprises at least 3 layers and wherein each external layer independently comprises a linear polyethylene having a density greater than 0.94 g/cm3 and a melt index greater than or equal to 2.0 g/10 min.

\* \* \* \* \*